(12) United States Patent
Takaki et al.

(10) Patent No.: US 9,557,410 B2
(45) Date of Patent: Jan. 31, 2017

(54) RADAR RECEPTION DEVICE, RADAR APPARATUS AND RADAR RECEPTION SIGNAL DISPLAYING METHOD

(71) Applicant: Furuno Electric Co., Ltd., Nishinomiya (JP)

(72) Inventors: Toshiaki Takaki, Nishinomiya (JP); Yugo Kubota, Nishinomiya (JP); Yasuhisa Fujii, Nishinomiya (JP)

(73) Assignee: Furuno Electric Co. Ltd., Nishinomiya (JP)

( * ) Notice: Subject to any disclaimer, the term of this patent is extended or adjusted under 35 U.S.C. 154(b) by 463 days.

(21) Appl. No.: 14/037,266

(22) Filed: Sep. 25, 2013

(65) Prior Publication Data

US 2014/0085134 A1    Mar. 27, 2014

(30) Foreign Application Priority Data

Sep. 26, 2012   (JP) ................................. 2012-212743

(51) Int. Cl.
*G01S 7/12*   (2006.01)
*G01S 7/298*   (2006.01)
(Continued)

(52) U.S. Cl.
CPC ................. *G01S 7/12* (2013.01); *G01S 7/298* (2013.01); *G01S 7/2922* (2013.01); *G01S 7/34* (2013.01)

(58) Field of Classification Search
CPC ........... G01S 7/12; G01S 7/298; G01S 7/2922
(Continued)

(56) References Cited

U.S. PATENT DOCUMENTS

2006/0145914 A1*   7/2006  Fujikawa ................ G01S 7/064
                                                                342/185
2007/0146197 A1*   6/2007  Wimmer .................. G01S 7/298
                                                                342/185
(Continued)

FOREIGN PATENT DOCUMENTS

JP            S319218 B    10/1956
JP            S54147862 A  11/1979
(Continued)

*Primary Examiner* — Peter Bythrow
*Assistant Examiner* — Helena Seraydaryan
(74) *Attorney, Agent, or Firm* — Alleman Hall McCoy Russell & Tuttle LLP (57) ABSTRACT

A radar reception device is provided. The device includes a reception signal acquirer, a signal processor, a PPI-scope generator, an A-scope generator, a display output unit, and a user interface. The reception signal acquirer acquires, in an Rθ-coordinate system, a reception signal received by an antenna that rotates at a predetermined cycle. The signal processor performs signal processing on the reception signal in the Rθ-coordinate system according to a distance, and outputs the processed signal in the Rθ-coordinate system. The PPI-scope generator converts the processed signal from the Rθ-coordinate system into an XY-orthogonal coordinate system and generates a radar image in a PPI-scope. The A-scope generator generates a radar image where the reception signal before being signal-processed is illustrated in an A-scope. The display output unit displays the PPI-scope radar image and the A-scope radar image on a display unit simultaneously. The user interface accepts a user input.

15 Claims, 8 Drawing Sheets

(51) Int. Cl.
 *G01S 7/292* (2006.01)
 *G01S 7/34* (2006.01)

(58) Field of Classification Search
 USPC .......................................................... 342/185
 See application file for complete search history.

(56) References Cited

U.S. PATENT DOCUMENTS

| | | | | |
|---|---|---|---|---|
| 2008/0030401 | A1* | 2/2008 | Kojima | G01S 7/298 |
| | | | | 342/185 |
| 2009/0121920 | A1* | 5/2009 | Mullarkey | G01S 7/2921 |
| | | | | 342/175 |
| 2009/0121923 | A1* | 5/2009 | Mainds | G01S 7/298 |
| | | | | 342/185 |
| 2011/0102248 | A1* | 5/2011 | Maeno | G01S 7/2927 |
| | | | | 342/179 |
| 2011/0109492 | A1* | 5/2011 | Nakahama | G01S 7/295 |
| | | | | 342/89 |
| 2012/0127019 | A1* | 5/2012 | Nishiyama | G01S 13/538 |
| | | | | 342/93 |
| 2013/0076561 | A1* | 3/2013 | Kubota | G01S 7/062 |
| | | | | 342/179 |
| 2015/0061926 | A1* | 3/2015 | Ranney | G01S 13/9029 |
| | | | | 342/25 B |

FOREIGN PATENT DOCUMENTS

| | | |
|---|---|---|
| JP | S58110869 U | 7/1983 |
| JP | S60205382 A | 10/1985 |
| JP | S63163185 A | 7/1988 |
| JP | S6449894 A | 2/1989 |
| JP | H0815419 A | 1/1996 |
| JP | H0972958 A | 3/1997 |
| JP | 2000098022 A | 4/2000 |

* cited by examiner

RADAR RECEPTION DEVICE, RADAR APPARATUS AND RADAR RECEPTION SIGNAL DISPLAYING METHOD

CROSS-REFERENCE TO RELATED APPLICATION(S)

The application claims priority under 35 U.S.C. §119 to Japanese Patent Application No. 2012-212743, which was filed on Sep. 26, 2012, the entire disclosure of which is hereby incorporated by reference.

TECHNICAL FIELD

The present invention generally relates to a radar apparatus, specifically, a configuration for assisting work of setting a characteristic of an STC (Sensitivity Time Control) in the radar apparatus.

BACKGROUND OF THE INVENTION

Generally, pulse radar apparatuses transmit pulsed high-frequency signals from antennas and receive reflection signals from target objects in the surroundings.

Generally, a radar apparatus includes a display device for displaying a signal received by an antenna as a radar image. A user of the radar apparatus can check the displayed radar image to confirm a target object in the surroundings. There exist various modes of displaying the signal received by the antenna, for example, JP1996-015419A and JP1993-012640B disclose an A-scope display and a PPI (Plan Position Indicator) scope display.

In the A-scope display, by taking a distance to a target object in the horizontal axis and a signal level in the vertical axis, the reception signal is displayed in a chart. The A-scope display has a merit of easily distinguishing a target object echo from a direction in which the antenna is oriented, and it is used in a tracking radar (JP1993-012640B). However, since antennas of radar apparatuses which are generally used in ships and the like always rotate, even if the signal received by the antenna is displayed in the A-scope in real time, the A-scope display is hardly of any use in a target detection. Therefore, the A-scope display is hardly used in ship radars (see L.10, 7th column of JP1995-027020B).

In the PPI-scope display, the signal received by the antenna is displayed by being plotted in a two-dimensional rectangular coordinate system. The PPI-scope display has a merit of allowing a user to easily instinctively confirm the position of the target object in a horizontal plane. Therefore, ship radars generally use the PPI-scope display.

Meanwhile, the level of a reflection signal from a target object in a close distance is high, and the level of a reflection signal from a target object in a far distance is weak. Therefore, if a radar image in the PPI-scope is generated by using the received signal as it is, since the view of the echo image becomes completely different depending on whether the target object is in a close distance or a far distance, the radar image will be difficult to be viewed.

Therefore, in the field of radar apparatus, processing which is a so-called STC (Sensitivity Time Control) of adjusting the level of the reception signal according to the distance to the target object is generally performed. Specifically, the sensitivity is decreased when the signal from a close distance is received and the sensitivity is increased as the distance is farther. For example, JP1997-072958A discloses such an STC.

With the radar apparatus, an adjustment of a characteristic of the STC becomes important to facilitate viewing of the PPI-scope radar image on display. In this regard, JP1997-072958A discloses a configuration in which the STC characteristic can be changed by adjusting it while looking at a display screen of a CRT (the display screen with the PPI-scope radar image displayed thereon) so that the image which can be easily viewed can be obtained.

With the radar apparatus, by the STC adjustment, if the echo image of the target object is eliminated along with clutter, there may be a case where an important target object cannot be confirmed with the radar image. Therefore, when adjusting the STC, the adjustment to appropriately remain the echo image of the required target object is requested.

However, with the configuration of JP1997-072958A, no method can confirm that only clutter is eliminated (the echo image of the target object is appropriately remained) by the STC processing. Therefore, whether the adjustment of the STC is appropriately performed cannot be evaluated instantly.

All told, even with the configuration which enable to adjust the STC while looking at the radar image displayed on the CRT as JP1997-072958A, in order to display the radar image so that only clutter is eliminated and the echo image of the target object is remained, the adjustment of the STC requires trial-and-error. Thus, with the configuration of JP1997-072958A, the adjustment of the STC is considered no easy.

SUMMARY OF THE INVENTION

The present invention is made in view of the above situation, and aims to provide a radar apparatus that can easily adjust an STC.

According to one aspect of the present invention, a radar reception device having the following configuration is provided. The device includes a reception signal acquirer, a signal processor, a PPI-scope generator, an A-scope generator, a display output unit, and a user interface. The reception signal acquirer acquires, in an Rθ-coordinate system, a reception signal received by an antenna that rotates at a predetermined cycle. The signal processor performs signal processing on the reception signal in the Rθ-coordinate system according to a distance, and outputs the processed signal in the Rθ-coordinate system. The PPI-scope generator converts the processed signal from the Rθ-coordinate system into an XY-orthogonal coordinate system and generates a radar image in a PPI-scope. The A-scope generator generates a radar image where the reception signal before being signal-processed by the signal processor is illustrated in an A-scope. The display output unit displays the PPI-scope radar image and the A-scope radar image on a display unit simultaneously. The user interface accepts a user input.

By simultaneously displaying in the A-scope based on the non-signal-processed reception signal and the PPI-scope based on the signal-processed reception signal as above, the situations before and after the signal processing can be compared by viewing. Thus, it can easily be determined whether the signal processing is performed appropriately.

The radar reception device is preferred to be configured as follows. That is, the signal processor performs the signal processing by applying a threshold on a signal level of the reception signal, the threshold set according to the distance. The A-scope generator generates the radar image by superimposing a threshold curve showing a relation between the threshold and the distance, on the reception signal illustrated in the A-scope.

According to this, a relation between the threshold used for the signal processing by the signal processor and the signal level of the reception signal to be the signal processing target can be easily be grasped. Therefore, it can easily be determined whether the threshold used in the signal processing by the signal processor is appropriately set.

The radar reception device is preferred to be configured as follows. That is, the user interface accepts the user input to adjust or change the threshold curve in a state where the threshold curve is displayed on the display unit. The A-scope generator generates the radar image where the adjustment or the changing is reflected thereon.

As described above, the threshold curve can be adjusted (or changed) in the state where the threshold curve is displayed by being superimposed on the A-scope display. Thus, the adjustment (or the change) of the threshold curve can be performed easily and accurately. As a result, the result of the adjustment (or the change) of the threshold curve is reflected on the display unit. Therefore, the effect of the adjustment (or the change) can instantly be confirmed.

The radar reception device is preferred to be configured as follows. That is, the threshold curve includes a plurality of threshold curves. The user interface selects one of the plurality of threshold curves. The signal processor performs the signal processing by using the threshold curve selected by the user interface.

By preparing a plurality of choices of the threshold curve as above, the threshold curve can be set by selecting any of the curves. Therefore, the setting of the threshold curve becomes easy. By displaying the plurality of selectable threshold curves by superimposing them on the A-scope display, a desirable threshold curve to choose can be grasped instinctively.

With the radar reception device, the A-scope generator is preferred to vary a display mode between the currently selected threshold curve and the other threshold curve.

According to this, an optimal threshold curve becomes easy to be selected among the plurality of threshold curves.

The radar reception device is preferred to be configured as follows. That is, the radar reception device also includes a threshold determiner for determining whether the signal level of the reception signal before being signal-processed by the signal processor exceeds the threshold. Based on a determination result of the threshold determiner, the A-scope generator generates the radar image by varying a display mode between a reception signal element of the reception signal having a signal level above the threshold and a reception signal element of the reception signal having a signal level below the threshold.

According to this, the part of the reception signal where the signal level exceeds the threshold becomes easy to be grasped. Therefore, the adjustment of the threshold curve can be performed more instinctively.

With the radar reception device, the display mode of a reception signal element of the reception signal illustrated in the A-scope of which the signal level exceeds the threshold is preferred to be matched with the display mode of an echo image contained in the PPI-scope radar image that corresponds to the reception signal element.

According to this, a relation between the echo image displayed in the PPI-scope and the reception signal displayed in the A-scope are easily understood, and the adjustment of the threshold curve becomes much easier.

With the radar reception device, the A-scope generator is preferred to generate the radar image where the reception signal in a predetermined A-scope display direction is illustrated in the A-scope.

Thus, the reception signal in a specific direction can be displayed in the A-scope. Therefore, the comparison between the A-scope and the PPI-scope by viewing becomes easy.

With the radar reception device, the user interface is preferred to be able to specify the A-scope display direction on the PPI-scope radar image displayed on the display unit.

According to this, a desired direction of the reception data to be displayed in the A-scope can instinctively be specified, and the relation between the A-scope and the PPI-scope can easily be grasped. Therefore, the adjustment of the threshold curve can be performed much easier.

According to another aspect of the present invention, a radar apparatus is provided. The apparatus includes the radar reception device of the above aspect, the antenna, and a transmitter for applying a transmission signal to the antenna.

According to further another aspect of the present invention, a method of displaying a radar reception signal is provided. The method includes acquiring, in an Rθ-coordinate system, a reception signal received by an antenna that rotates at a predetermined cycle. The method also includes performing signal processing on the reception signal in the Rθ-coordinate system according to a distance, and outputting the processed signal in the Rθ-coordinate system. The method also includes converting the processed signal from the Rθ-coordinate system into an XY-orthogonal coordinate system and generating a radar image in a PPI-scope. The method also includes generating a radar image where the reception signal before being signal-processed by the performing the signal processing is illustrated in an A-scope. The method also includes displaying the PPI-scope radar image and the A-scope radar image on a display unit simultaneously. The method also includes accepting a user input.

The radar reception signal displaying method is preferred to be performed as follows. That is the performing the signal processing includes performing the signal processing by applying a threshold on a signal level of the reception signal, the threshold set according to the distance. The generating the radar image in the A-scope includes generating the radar image by superimposing a threshold curve showing a relation between the threshold and the distance, on the reception signal illustrated in the A-scope.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Figure 1:
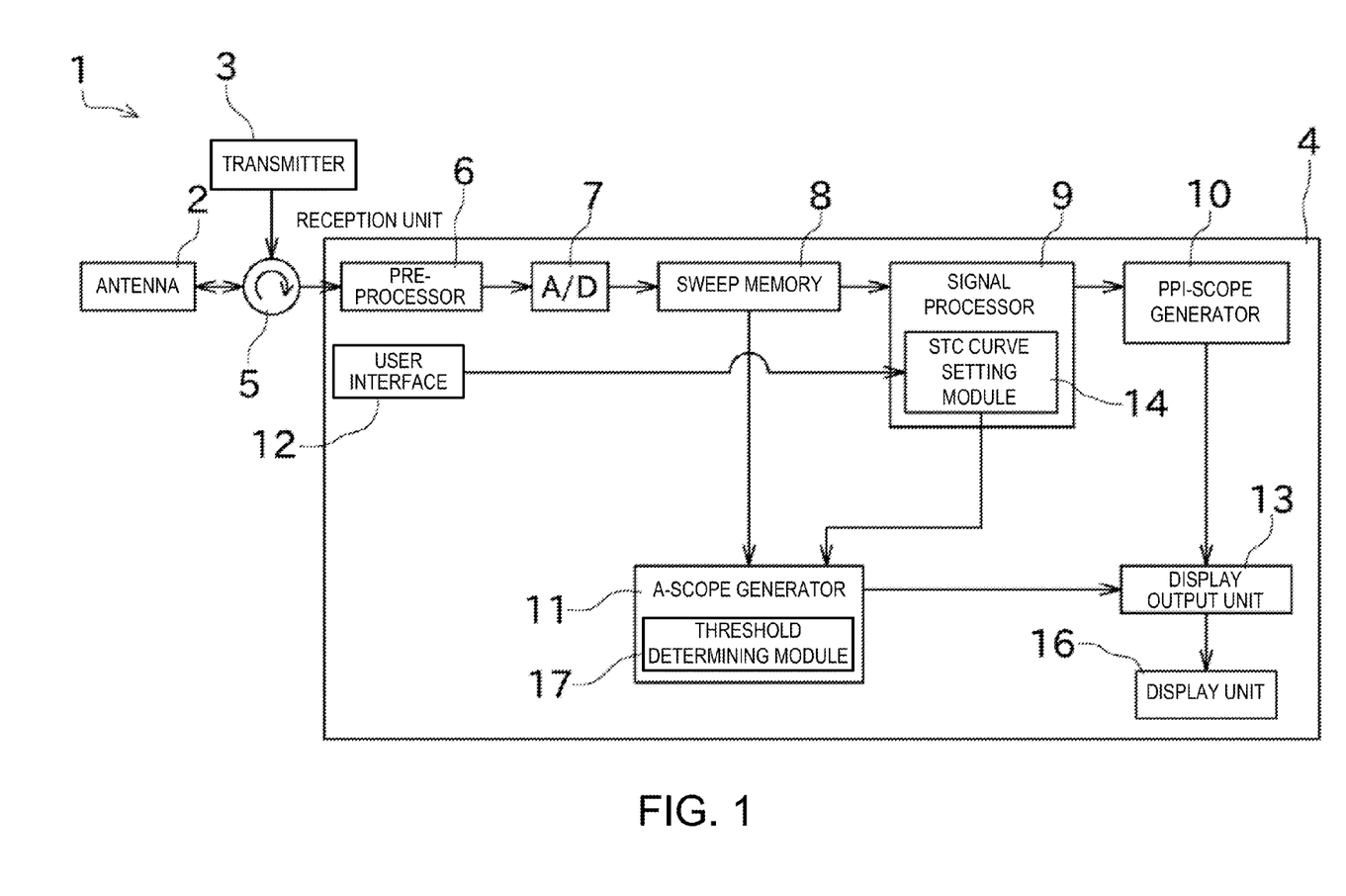
FIG. 1 is a block diagram showing an overall configuration of a radar apparatus according to a first embodiment of the invention.

Next, a first embodiment of the present invention is described with reference to the accompanying drawings. A radar apparatus 1 of this embodiment is a ship pulse radar apparatus equipped in a ship. The radar apparatus 1 mainly includes an antenna 2, a transmitter 3, and a reception unit 4 (radar reception device).

The antenna 2 is connected with the transmitter 3 and the reception unit 4 via a circulator 5. The antenna 2 has a well-known configuration of rotating in 360 degrees on a horizontal plane at a predetermined rotation cycle.

The transmitter 3 has an oscillator (e.g., magnetron) and applies a high-frequency signal which is pulse-modulated, to the antenna 2 at a predetermined cycle. Thus, the pulse-modulated high-frequency signal is transmitted from the rotating antenna 2 at the predetermined cycle. In the following description, the signal transmitted from the antenna 2 is referred to as the transmission signal.

Moreover, the antenna 2 receives high-frequency signal(s) from the surroundings in a period from after the antenna 2 transmits the transmission signal until it transmits the next transmission signal. In the following description, the signal received by the antenna 2 is referred to as the reception signal. Note that, the reception signal received by the antenna 2 may include a "reflection signal element" obtained by the transmission signal reflected on a target object and returned back, and an "unnecessary signal element," such as noise and clutter. The reception signal is inputted into the reception unit 4.

The reception unit 4 of this embodiment includes a preprocessor 6 (reception signal acquirer), an A/D converter 7, a sweep memory 8, a signal processor 9, a PPI-scope generator 10, an A-scope generator 11, a user interface 12, a display output unit 13, and a display unit 16.

The reception signal received by the antenna 2 is inputted into the preprocessor 6. As well known, when a distance from the antenna 2 to the target object existing in a direction in which the antenna 2 is oriented R, the distance R can be acquired based on the signal received by the antenna 2 of the pulse radar apparatus. When the direction in which the antenna 2 is oriented is $\theta$, the reception signal acquired by the preprocessor 6 is a reception signal in an R$\theta$-coordinate system. The preprocessor 6 performs processing including amplification, filtering, down-conversion, on the acquired reception signal in the R$\theta$-coordinate system, and then outputs it to the A/D converter 7.

The A/D converter 7 samples the reception signal in the R$\theta$-coordinate system inputted from the preprocessor 6 at a predetermined sampling cycle and converts each signal into digital data, and sequentially outputs it to the sweep memory 8. Thus, chronological data indicating a signal level of the reception signal in the R$\theta$-coordinate system is obtained. The chronological data obtained as above is referred to as reception data. Note that, here, each of the analog reception signal and the digital reception data may simply be referred to as the "reception signal" without being discriminated from each other.

The sweep memory 8 is a memory storage that can store reception data for one sweep. Note that, the "reception data for one sweep" is referred to as reception data acquired in a period from after the transmission signal is transmitted from the antenna 2 until the next transmission signal is transmitted. The sweep memory 8 functions as a buffer memory, and when new reception data is inputted therein, the old reception data is overwritten sequentially by the new reception data. The reception data stored in the sweep memory 8 may specifically be referred to as sweep data.

The signal processor 9 sequentially reads the reception data (sweep data) in the R$\theta$-coordinate system which is stored in the sweep memory 8, and performs signal processing on the reception data according to the distance, and outputs the processed data (processed signal).

Various processing may be considered as the "signal processing according to the distance," the signal processor 9 of this embodiment performs general STC (Sensitivity Time Control) processing. Hereinafter, the STC processing of this embodiment is briefly described with reference to FIGS. 2A to 2C.

Figure 2A:
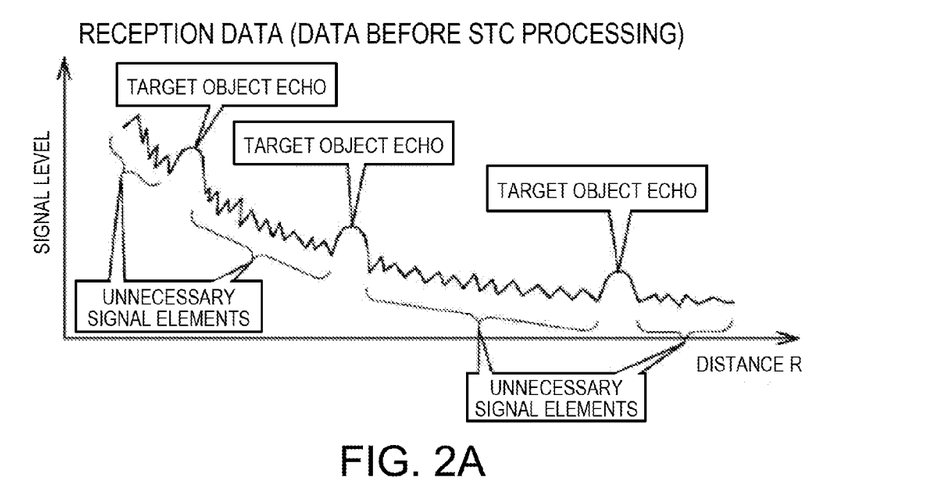
FIGS. 2A to 2C are charts for describing signal processing (STC) of the first embodiment.

FIG. 2A is a schematic chart of the reception data (sweep data) for one sweep stored in the sweep memory 8. Each of the horizontal axes of FIGS. 2A, 2B, and 2C indicates a period of time that takes from the transmission of the transmission signal to the acquisition of the data by the A/D converter 7, and the period of time corresponds to the distance R to the target object reflected by the signal. The vertical axis indicates the signal level of each data.

When the antenna 2 performs the transception of the signal, if the target object exists in the direction $\theta$ in which the antenna 2 is oriented, the reflection signal element from the target object is received by the antenna 2. The reflection signal element from the target object received as above (target object echo) appears as a peak of the signal level in the reception data as shown in FIG. 2A.

As shown in FIG. 2A, the reception data from a close distance has a high signal level, and the reception data from a far distance has a low signal level. The STC processing is an adjustment such that the signal level of the reception data is about the same level regardless of the distance.

Figure 2B:
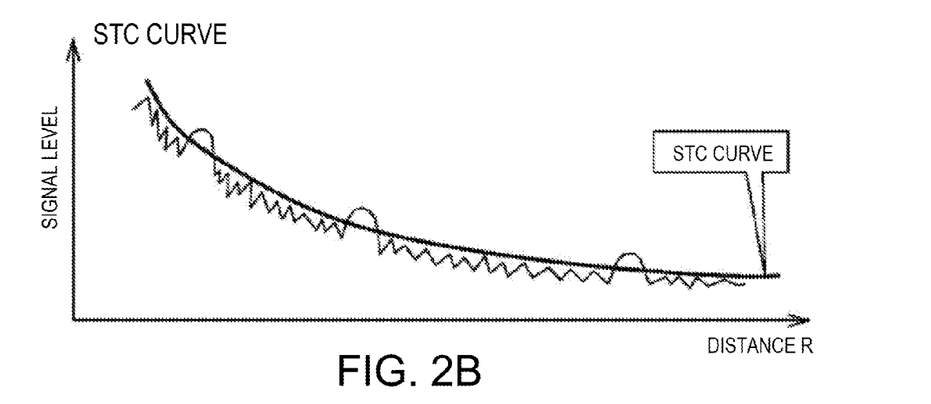

Specifically, the signal processor 9 includes an STC curve setting module 14 for setting an STC curve shown in FIG. 2B. The STC curve is a curve for setting a relation between a threshold used in the STC processing, and the distance R (threshold curve).

The STC curve, in principle, can be any straight line and curve line. However, if the STC curve is a complicated curve line, the setting of the STC curve becomes bothersome and, in addition, such complicated STC curve may be inappropriate for the STC processing. In this embodiment, for the sake of convenience in setting, the STC curve is a simple curve line that can be expressed with several parameters. The STC curve setting module 14 generates the STC curve based on parameters stored therein, and outputs the threshold corresponding to the distance.

Figure 2C:
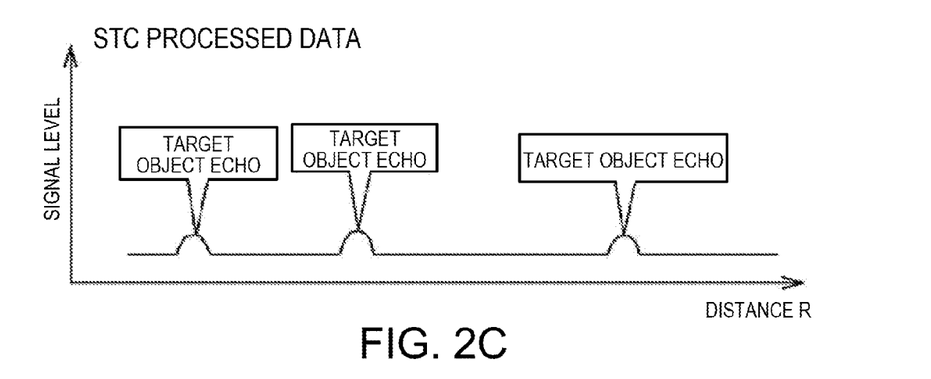

As shown in FIG. 2B, the STC curve is set to have a larger threshold at a closer distance and a smaller threshold at a farther distance. The signal processor 9 reads the reception data in the R$\theta$-coordinate system from the sweep memory 8 and acquires the threshold corresponding to the distance R of the reception data from the STC curve setting module 14. Moreover, the signal processor 9 compares the signal level of the reception data in the R$\theta$-coordinate system with the threshold. When the signal level of the reception data exceeds the threshold, the signal processor 9 subtracts threshold from the signal level of the reception data and outputs it as the processed data in the R$\theta$-coordinate system. In other words, in the reception data, only the part above the STC curve is outputted from the signal processor 9 as the processed data. The example of the processed data outputted from the signal processor 9 is shown in FIG. 2C.

As long as the STC curve is set appropriately, the signal level of the threshold differing depending on the distance can be corrected by the STC processing. Therefore, as shown in FIG. 2C, the reflection signal element from the target object at a close distance and the reflection signal element from the target object at a far distance can be uniformed to be about the same as each other. Additionally, by setting the STC curve to above the levels of noise and clutter, the processed data where the unnecessary signal elements such as the noise and clutter are removed and only the reflection signal elements from the target objects are remained can be obtained.

The processed data in the Rθ-coordinate system outputted from the signal processor 9 is inputted into the PPI-scope generator 10 (image generator). The PPI-scope generator 10 converts the coordinate of the inputted processed data from the Rθ-coordinate system into in an XY-orthogonal coordinate system to create a PPI-scope radar image. Note that, the explanation of the configuration of generating the PPI-scope radar image by converting the coordinate of the data from the Rθ-coordinate system into the XY-orthogonal coordinate system is omitted since it is known.

The PPI-scope radar image generated by the PPI-scope generator 10 is outputted to the display output unit 13. The display output unit 13 causes the display unit 16 to display the inputted radar image. The display unit 16 is a display unit such as a liquid crystal display, and can display a color raster image in a raster format.

Figure 3:
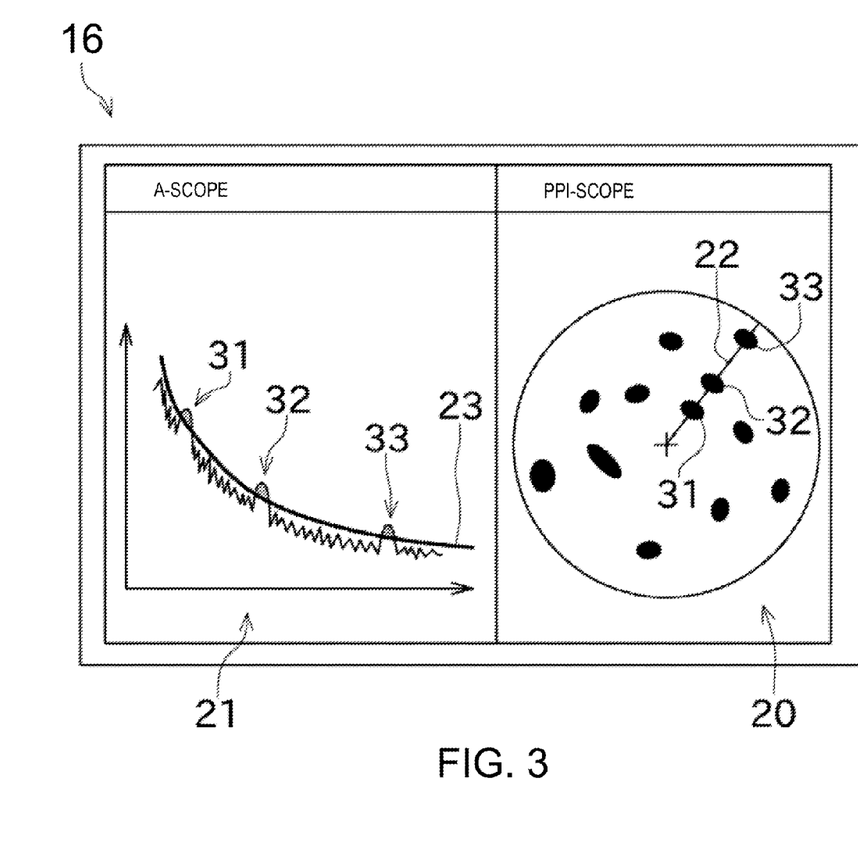
FIG. 3 is a view showing a display example of a display unit of the first embodiment.

FIG. 3 is a screen display example of the display unit 16. As shown in FIG. 3, the display screen of the display unit 16 has a PPI-scope display section 20 where the PPI-scope radar image generated by the PPI-scope generator 10 is displayed. The user of the radar unit 1 can know the situation of the target object(s) in the surroundings by checking the PPI-scope radar image displayed within the PPI-scope display section 20.

Note that, the PPI-scope radar image displayed within the PPI-scope display section 20 is generated based on the data after STC-processed. Therefore, by appropriately setting the STC curve, the viewing of the radar image within the PPI-scope display section 20 on display can be facilitated.

The radar apparatus 1 includes the user interface 12 for adjusting various parameters stored in the STC curve setting module 14. The user interface 12 may have a configuration that can be controlled physically, for example, dials, buttons, a keyboard, or may be a menu displayed on a touch panel display. The user can suitably change a vertical position, an inclination, a curvature and the like of the STC curve by adjusting the parameters by controlling the user interface 12.

When the user changes the parameters of the STC curve by controlling the user interface 12, the changed parameters are instantly reflected on the STC curve setting module 14, and thereafter, the signal processor 9 performs the STC processing based on the changed STC curve. Therefore, when the user changes the parameters of the STC curve, the radar image displayed within the PPI-scope display section 20 is updated with the radar image based on the changed STC curve. Since the adjustment of the STC curve by the user is reflected on the PPI-scope display section 20 as above, the user can adjust the STC curve while looking at the PPI-scope display section 20.

Next, the description is given about the characteristic configuration of this embodiment.

As shown in FIG. 3, the display screen of the display unit 16 of this embodiment also displays an A-scope display section 21 simultaneously to the PPI-scope display section 20. The A-scope display section 21 is displayed with a radar image in which the reception data is shown in the A-scope. Thus, the user can compare the A-scope display with the PPI-scope display by viewing.

Hereinafter, the characteristic configuration is described further in detail. The receiver 4 of the radar apparatus 1 of this embodiment includes an A-scope generator 11. The A-scope generator 11 reads the reception data (sweep data) stored in the sweep memory 8, and generates an A-scope radar image showing the relation between the signal level of the reception data and the distance R from the antenna 2. The A-scope radar image generated by the A-scope generator 11 is outputted to the display output unit 13.

The display output unit 13 outputs on the display unit 16, the PPI-scope radar image inputted from the PPI-scope generator 10 and the A-scope radar image inputted from the A-scope generator 11. The display unit 16 displays the PPI-scope radar image within the PPI-scope display section 20 and the A-scope radar image in the A-scope display section 21. As described above, the PPI-scope display section 20 is displayed side by side with the A-scope display section 21 simultaneously.

With the above configuration, the PPI-scope radar image can be displayed on the display unit 16 side by side with the A-scope radar image simultaneously.

Since the sweep memory 8 is arranged before the stage of the signal processor 9, the reception data (sweep data) stored in the sweep memory 8 corresponds to the reception data before STC-processed by the signal processor 9. Therefore, the radar image generated by the A-scope generator 11 shows the reception data before STC-processed by the signal processor 9, in the A-scope.

Thus, the reception data before signal-processed by the signal processor 9 (sweep data) can be displayed in the A-scope display section 21 as the A-scope radar image. On the other hand, as described above, the PPI-scope radar image displayed within the PPI-scope display section 20 is generated based on the data after signal-processed by the signal processor 9 (processed data).

Therefore, the user can compare the reception data before STC-processed by the signal processor 9 (A-scope) with the reception data after the STC processing (PPI-scope) by looking at the screen display of the display unit 16.

As described above, with the radar apparatus 1 of this embodiment, the user can adjust the STC curve by controlling the user interface 12. The control of the user interface 12 can be performed in a state where the PPI-scope display section 20 and the A-scope display section 21 are on the display screen of the display unit 16. Therefore, the user can adjust the STC curve by comparing the PPI-scope with the A-scope by viewing.

On the other hand, the adjustment of the STC curve in the conventional radar apparatus (e.g., JP1997-072958A) is generally performed while looking at the reception data after STC-processed (PPI-scope, processed data), but not the reception data before STC-processed (A-scope, sweep data). However, since the STC processing target is consistently the sweep data, if the sweep data cannot be viewed, the STC curve cannot be adjusted directly.

With the radar apparatus 1 of this embodiment, the sweep data (A-scope) which is the "processing target" in the STC processing can be compared, by viewing, with the processed data (PPI-scope) which is the "processing result" in the STC processing. As a result, it can easily be determined whether the STC curve is appropriate, and thus, compared to the conventional apparatus, the STC curve can be adjusted more directly.

Note that, the A-scope generator 11 of this embodiment generates the A-scope radar image so that all the reception data for the latest one sweep is displayed. In other words, in the A-scope display section 21 of this embodiment, the reception data for the entire range in the distance direction is displayed in the A-scope. Thus, the user can check the reception data for one sweep at the single viewing of the A-scope display section 21. As a result, the adjustment of the STC curve can be performed efficiently.

Meanwhile, with radar apparatuses, in many cases where an A-scope radar image is used, the signal received by the antenna is displayed in real time. However, in the case of the radar apparatus 1 of this embodiment where the antenna 2 rotates at a predetermined cycle, if the signal received by the antenna 2 is displayed as it is in the A-scope in real time, the direction θ in which the signal is displayed in the A-scope changes with time. Therefore, it becomes difficult to compare the A-scope display with the PPI-scope display.

Thus, with the radar apparatus 1 of this embodiment, instead of displaying the acquired reception data as it is in the A-scope in real time, only the reception data in the specific direction θ is extracted and displayed in the A-scope. Hereinafter, the direction θ in which the signal is displayed in the A-scope is referred to as the A-scope display direction.

With the radar apparatus 1 of this embodiment, an azimuth indication line 22 (EBL: Electronic Bearing Line) is displayed on the radar image displayed within the PPI scope display section 20. The azimuth indication line 22 is a straight line displayed on the PPI-scope radar image with a central coordinate (position of the antenna 2) as an origin to indicate the A-scope display direction. By this azimuth indication line 22, the A-scope display direction can be specified on the PPI-scope.

The direction specified by the azimuth indication line 22 (A-scope display direction) can be changed by the user suitably controlling the user interface 12. Thus, the user can instantly specify the desirable A-scope display direction while looking at the azimuth indication line 22 displayed within the PPI scope display section 20.

When the antenna 2 points the A-scope display direction specified by the azimuth indication line 22, the A-scope generator 11 acquires by reading the reception data (sweep data) for the latest one sweep which is stored in the sweep memory 8. Thus, the A-scope generator 11 generates the radar image in which the acquired reception data is shown in the A-scope.

As above, the reception data in the A-scope display direction specified by the user is displayed within the A-scope display section 21 in the A-scope. By displaying the reception data in the specific direction in the A-scope, the user can determine the validity of the STC processing by comparing the A-scope display with the PPI-scope display.

In the case of FIG. 3, it can be seen that the reception data displayed within the A-scope display section 21 (sweep data) has three peaks. Thus, it can be understood that three target objects exist in the A-scope display direction and the reflection signals from the respective three target objects are received. Here, the reflection signals from the three target objects in FIG. 3 are referred to as the first target object echo 31, the second target object echo 32, and the three target object echo 33 in this order from a side closer to the antenna 2.

On the other hand, when seeing the PPI-scope display section 20 of FIG. 3, the three echo images exist on the azimuth indication line 22 indicating the A-scope display direction. Therefore, it can be considered that the three echo images in the PPI-scope respectively correspond to the first target object echo 31, the second target object echo 32, and the three target object echo 33 in this order from a side closer to the center coordinate (the position of the antenna 2). In this case, it can be understood that the reflection signals from the three target objects are remained even after the STC processing. Thus, the STC curve can be evaluated as being set appropriately.

Figure 4:
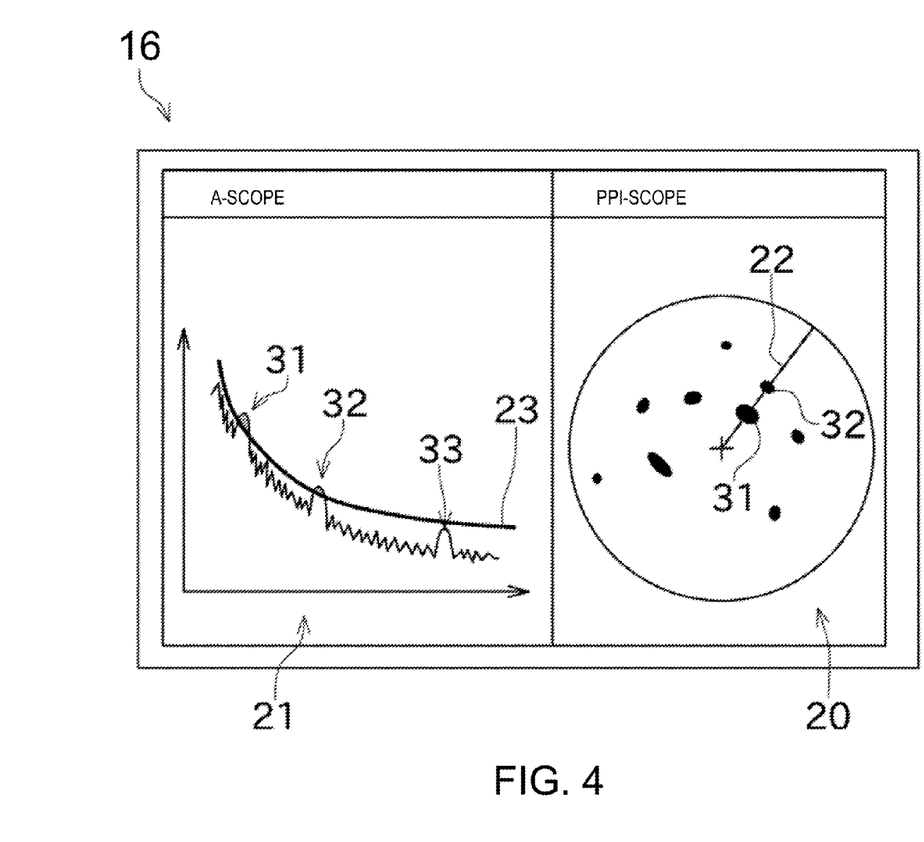
FIG. 4 is a view showing a display example of the display unit in a case where setting of an STC curve is inappropriate.

On the other hand, in the case of FIG. 4, although the reception data displayed within the A-scope display section 21 has three peaks, within the PPI-scope display section 20, only two echo images exist on the azimuth indication line 22 indicating the A-scope display direction. More specifically, although the echo images corresponding to the first and second target object echoes 31 and 32 are displayed on the azimuth indication line 22 displayed within the PPI-scope display section 20 of FIG. 4, the echo image corresponding to the third target object echo 33 is not displayed. In this case, it can be understood that the third target object echo 33 is eliminated by the STC processing. Thus, the STC curve can be evaluated as inappropriate.

Figure 5:
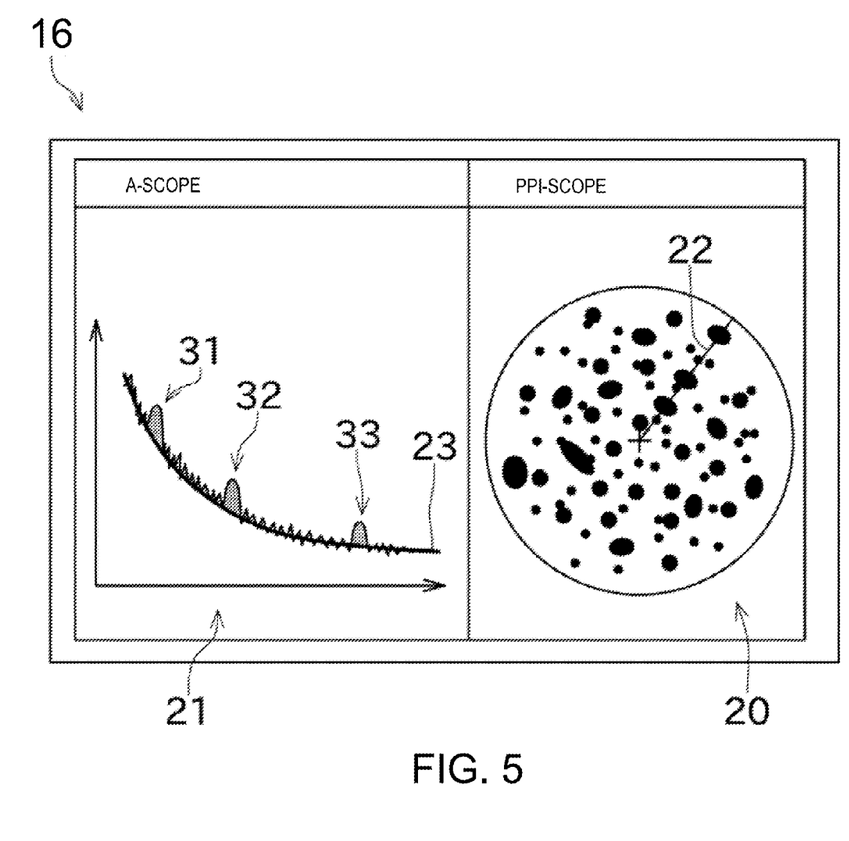
FIG. 5 is a view showing another display example of the display unit in a case where setting of an STC curve is inappropriate.

Moreover, for example, in the case of FIG. 5, although the reception data displayed in the A-scope display section 21 has the three peaks, in the PPI-scope display section 20, a large number (three or more) of echo images are displayed on the azimuth indicating line 22 indicating the A-scope display direction. In this case, it can be understood that the unnecessary signal elements, such as noise and clutter, are not appropriately removed. Thus, the STC curve can be evaluated as not being set appropriately.

As described above, the receiver 4 provided to the radar apparatus 1 of this embodiment includes the preprocessor 6, the signal processor 9, the PPI-scope generator 10, the A-scope generator 11, and the display output unit 13. The preprocessor 6 acquires the reception signal received by the antenna 2 rotating at the predetermined cycle in the Rθ-coordinate system. The signal processor 9 performs the signal processing on the reception signal in the Rθ-coordinate system depending on its distance, and outputs the processed signal in the Rθ-coordinate system. The PPI-scope generator 10 converts the processed signal from the Rθ-coordinate system into the XY-orthogonal coordinate system to generate the PPI-scope radar image. The A-scope generator 11 generates the radar image in which the reception signal before signal-processed by the signal processor 9 is illustrated in the A-scope. The display output unit 13 causes the display unit 16 to display the PPI-scope radar image and the A-scope radar image simultaneously.

Therefore, a method of displaying a radar reception signal by the receiver 4 of the radar apparatus 1 of this embodiment is as follows. Specifically, the radar reception signal displaying method includes causing the preprocessor 6 to acquire, in the Rθ-coordinate system, the reception signal received by the antenna 2 that rotates at a predetermined cycle. The radar reception signal displaying method also includes causing the signal processor 9 to perform the signal processing on the reception signal in the Rθ-coordinate system depending on its distance and output the processed signal in the Rθ-coordinate system. The radar reception signal displaying method also includes causing the PPI-scope generator 10 to convert the processed signal from the Rθ-coordinate system into the XY-orthogonal coordinate system to generate the PPI-scope radar image. The radar reception signal displaying method also includes causing the A-scope generator 11 to generate the radar image in which the reception signal before signal-processed by the signal processor 9 is illustrated in the A-scope. The radar reception signal displaying method also includes causing the display output unit 13 to cause the display unit 16 to display the PPI-scope radar image and the A-scope radar image simultaneously.

By simultaneously displaying the A-scope based on the non-STC-processed reception signal and the PPI-scope based on the STC-processed reception signal as above, the situations before and after the STC processing can be compared by viewing. Thus, it can easily be determined whether the STC processing is performed appropriately.

Next, the description is given about further characteristics of the radar apparatus 1 of this embodiment.

With the radar apparatus 1 of this embodiment, as shown in FIGS. 3 to 5, the STC curve 23 is displayed by superimposing on the reception data displayed in the A-scope.

Specifically, the further characteristics are as follows. The A-scope generator 11 receives information regarding the STC curve from the STC curve setting module 14. The A-scope generator 11 generates the STC curve 23 as an image based on the information inputted from the STC curve setting module 14. Moreover, the A-scope generator 11 generates the radar image in which the image of the STC curve 23 is superimposed on the reception data in the A-scope. Note that, as the image of the STC curve 23 is superimposed on the reception data shown in the A-scope, the A-scope generator 11 matches the vertical and horizontal axes of the STC curve 23 with the vertical and horizontal axes of the reception data shown in the A-scope. Thus, the radar image generated by the A-scope generator 11 as above is displayed within the A-scope display section 21 of the display unit 16.

According to the above configuration, by looking at the A-scope display section 21, the user can visually check the STC curve 23 and, additionally, grasp the relation between the STC curve 23 and the reception data. Thus, the user can grasp whether the STC curve 23 is appropriately set with respect to the reception data.

For example, by looking at the A-scope display section 21 of FIG. 4, among the three target object echoes 31, 32 and 33, the user can easily grasp that the STC curve 23 is excessively high against the third target object echo 33.

Moreover, for example, by looking at the A-scope display section 21 of FIG. 4, the user can easily grasp that the STC curve 23 is excessively low against the level of the unnecessary signal elements (noise and clutter) of the reception data.

As described above, according to the configuration of this embodiment, by looking at the display within the A-scope display section 21, the user can easily determine how to adjust the STC curve 23. Therefore, by controlling the user interface 12 while looking at the display within the A-scope display section 21, the user can easily adjust the parameters of the STC curve 23.

When the user controls the user interface 12 to change the parameters of the STC curve 23, the A-scope generator 11 of this embodiment generates the radar image on which the change is reflected. Thus, when the user controls the user interface 12 to change the parameters of the STC curve 23, the change is instantly reflected on the A-scope display section 21. Specifically, when the parameters of the STC curve 23 are changed due to the user controlling the user interface 12, the change is instantly reflected on the A-scope display section 21. In other words, when the parameters are changed due to the user controlling the user interface 12, accordingly, the vertical position, the inclination, the curvature and the like of the STC curve 23 displayed within the A-scope display section 21 instantly change.

Therefore, by adjusting the parameters of the STC curve 23, the user can confirm the change of the vertical position, the inclination, the curvature and the like of the STC curve 23 as the result thereof, within the A-scope display section 21 in real time. Thus, the parameters can be adjusted easily such that the STC curve 23 has a desired characteristic.

Moreover, within the A-scope display section 21 of this embodiment, as shown in FIGS. 3 to 5, the display mode is set to be different between the reception data above the STC curve 23 (the reception data of which the signal level exceeds the threshold) and the reception data below the STC curve (the reception data of which the signal level does not exceed the threshold). For example, in FIGS. 3 to 5, the example is shown where only the reception data above the STC curve 23 is daubed with a specific color. According to this, the user can easily grasp the part of the reception data where its signal level exceeds the threshold of the STC processing by looking at the display of the A-scope display section 21.

In order to achieve such display, the A-scope generator 11 of this embodiment includes a threshold determining module 17. The threshold determining module 17 determines whether the signal level of the reception data exceeds the threshold set by the STC curve. The A-scope generator 11 generates the radar image such that the display mode is different between the reception data of which the signal level exceeds the threshold and the reception data of which the signal level does not exceed the threshold based on the determination result of the threshold determining module 17.

Subsequently, the description is given about a modification of the first embodiment with reference to FIG. 6.

The A-scope generator 11 of the first embodiment is configured to generate the radar image such that the display mode of the reception data is different between the part above the STC curve 23 and the part below the STC curve 23. In this modification, this configuration is developed, and in the parts of the reception data above the STC curve 23 (the part where the signal level of the reception data exceeds the threshold), the reception data indicating the reflection signal elements obtained from different target objects are displayed in different display modes from each other.

The determination of whether the reception data corresponds to the reflection signal elements from the different target objects can be performed based on whether peaks of the signal levels of the parts above the STC curve 23 are separated from each other. For example, in the case of FIG. 6, in the parts above the STC curve 23, since the peaks of the first, second, and third target object echoes 31, 32 and 33 are separate from each other (not continuous to each other), it can be considered that these parts indicate the reflection signal elements from the different target objects.

In such a case, the A-scope generator 11 in this modification generates the radar image in which the display modes are different among the parts above the STC curve 23 corresponding to the target objects 31, 32 and 33. For example, the A-scope generator 11 of this modification generates the radar image in which the peaks above the STC curve 23 corresponding to the target object echoes 31, 32 and 33 are daubed with different colors. Note that, in FIG. 6, the difference in color is expressed by hatching the peaks of the target object echoes 31, 32 and 33 in different patterns.

The following is the effects of coloring the peaks of the parts above the STC curve 23 with different colors.

For example, if the peaks indicating the reflection signal elements from two or more target objects are continuous to each other at the parts above the STC curve 23, when the PPI-scope radar image is generated, the echo images of the two or more target objects are displayed, connected with each other. In this case, the echo images of the two or more target objects appear as if they are of a single target object. Therefore, it is preferable to adjust the STC curve 23 so that the respective peaks are separated appropriately from each other.

In this regard, in this modification, since the peaks which are independent (not continuous to each other) above the STC curve 23 are colored differently from each other, it can easily be recognized that if adjacent peaks are displayed with the same color, the adjacent peaks are not appropriately separated. Thus, it becomes easy to adjust the STC curve 23 so that the respective peaks can be separated appropriately.

In this modification, the display modes of corresponding parts between the reception signal elements of the reception signal shown in the A-scope of which the signal level exceeds the threshold, and the echo images of the PPI-scope radar image are configured to match with each other.

Figure 6:
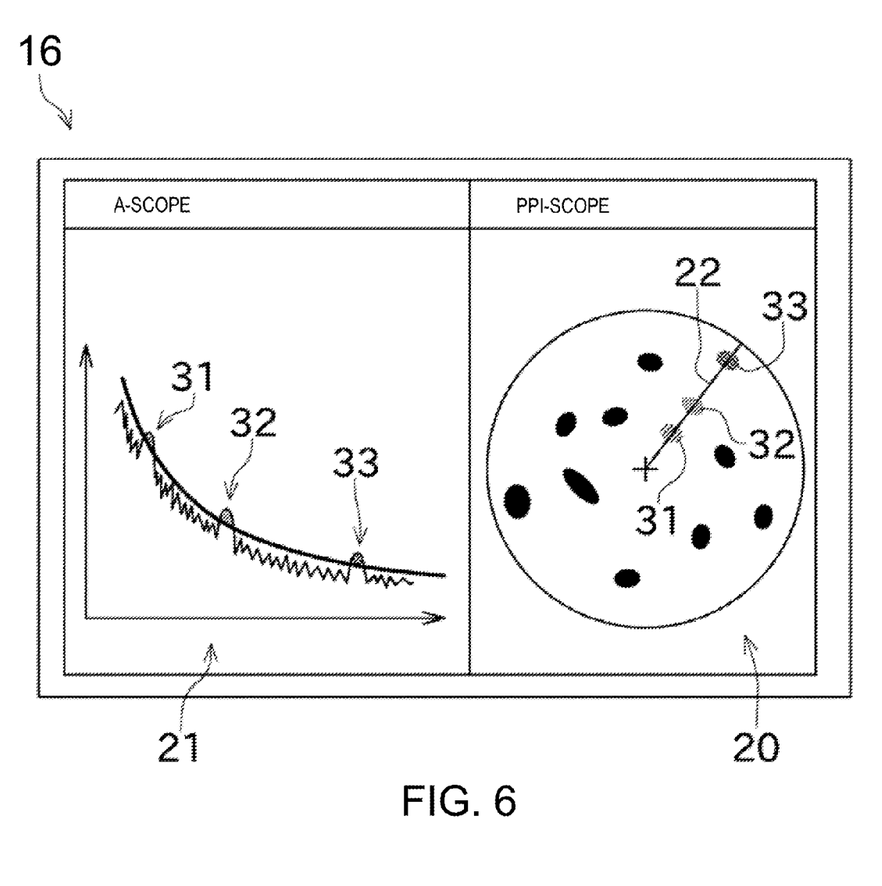
FIG. 6 is a view showing a modification of the first embodiment.

For example, as shown in FIG. 6, when three peaks 31, 32 and 33 which are independent (not continuous to each other) above the STC curve 23 exist within the A-scope display section 21, with the radar apparatus 1 of this modification, the colors daubed in peaks 31, 32 and 33 are matched with the display colors of the three echo images 31, 32 and 33 on the azimuth indication line 22 within the PPI-scope display section 20, respectively. Note that, in FIG. 6, the difference in the display colors of the echo images is expressed by hatching the echo images within the PPI-scope display section 20 in different patterns.

According to this, the relation between the peaks of the reception data displayed within the A-scope display section 21 and the echo images displayed within the PPI-scope display section 20 can be easily understood, and the adjustment of the STC curve 23 becomes much easier.

Next, the description is given about a second embodiment of the present invention. Note that, in the following description, the configuration that is common with or similar to the first embodiment may be denoted with the same reference numerals here and in the accompanying drawings, and the description thereof may be omitted.

In the first embodiment, the parameters of the STC curve 23 can be adjusted by the user controlling the user interface 12; however, in the case where the parameters of the STC curve 23 needs to be adjusted every time the situation changes, this becomes a great burden on the user.

Therefore, with the radar apparatus of the second embodiment, a plurality of STC curves where the settings of the parameters are different from each other are preset in the STC curve setting module 14.

With the radar apparatus of the second embodiment, by the user suitably controlling the user interface 12, he/she can select one of the plurality of preset STC curves. The signal processor 9 performs the STC processing by using the selected STC curve.

By presetting the plurality of STC curves in advance as above, the user can set the STC curve by only selecting one of the plurality of preset STC curves. According to this, the STC curve can be set easier compared to the case of adjusting the parameters of the STC curve every time the situation changes.

Moreover, with the radar apparatus of the second embodiment, the A-scope generator 11 generates the radar image by superimposing the plurality of preset STC curves on the reception data shown in the A-scope. The situation where the radar image generated as above is displayed is shown in FIG. 7.

Figure 7:
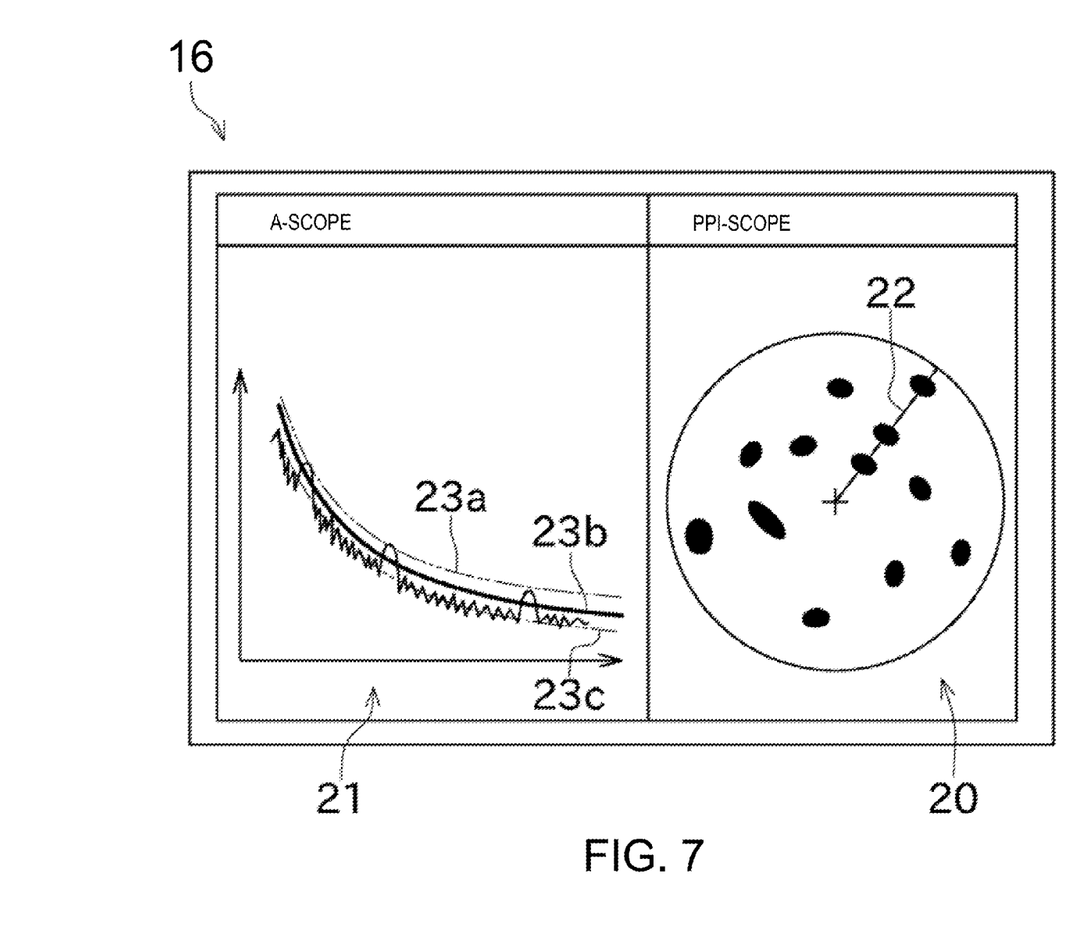
FIG. 7 a view showing a display example of the display unit of a second embodiment.

For example, within the A-scope display section 21 of FIG. 7, a first STC curve 23a, a second STC curve 23b, and a third STC curve 23c are displayed in this order from above by being superimposed on the reception data shown in the A-scope. By displaying the plurality of preset STC curves by being superimposed on the reception data shown in the A-scope as above, the user can instinctively grasp a desirable STC curve to choose.

Moreover, with the radar apparatus of the second embodiment, the A-scope generator 11 sets different display modes for the currently-selected STC curve and the other one or more non-selected STC curves. For example, in the example of FIG. 7, the currently-selected STC curve is displayed with a thick line and the one or more non-selected STC curves are displayed with a thin two-dot chain line, in other words, the kind of the line of the STC curve is different depending on whether it is selected or not. Note that, in the example of FIG. 7, the situation where the second STC curve 23b is selected is shown.

Thus, the user can easily grasp the selected STC curve by looking at the A-scope display section 21. Therefore, it becomes easy to select an optimal STC curve among the plurality of preset STC curves.

Although the suitable embodiments and the modification of the present invention is described above, the above configurations may further be modified as follows, for example.

In the above embodiments, the A-scope generator 11 acquires the reception data and generates the A-scope radar image when the antenna 2 points the predetermined direction. Since the antenna 2 rotates on the horizontal plane at the predetermined cycle, the A-scope generator 11 generates the radar A-scope radar image at the rotation cycle of the antenna 2. Therefore, the radar image displayed within the A-scope display section 21 is updated at the rotation cycle of the antenna 2. However, not limited to this, for example, it may be such that the radar image within the A-scope display section 21 is not updated unless the user explicitly instructs to update.

The A-scope generator 11 may accumulate the reception data in all the azimuths in the memory. In this case, when the user specifies the A-scope display direction, the A-scope generator 11 can read the reception data from the memory in the specified direction and generate an A-scope radar image. According to this, the reception data in the specified direction can instantly be displayed in the A-scope without relying on the rotation cycle of the antenna 2.

In the above embodiments, the reception data in the specified direction is displayed in the A-scope, but it is not limited to this. For example, the reception data received by the antenna 2 may be displayed in the A-scope in real time. In other words, in this case, the reception data in the direction to which the antenna 2 currently points is displayed within the A-scope display section 21.

The reception data displayed in the A-scope is not necessarily limited to the reception data in the specific direction. For example, the reception data obtained in all the directions is averaged for each distance, and the averaged reception data may be displayed in the A-scope. By displaying the averaged reception data in the A-scope as above, the overall tendency of the reception data can be grasped.

Additionally, the threshold curve is not limited to the STC curve, but may be a curve showing a relation between the threshold for a gain control of the reception data (sweep data) and the distance. For example, the curve taking a moving average of the signal levels of the reception signal elements may be displayed as the threshold curve. Thus, the user can confirm the result in the case of using the moving average curve as the threshold curve.

In the above embodiments, the PPI-scope display section 20 and the A-scope display section 21 are displayed side by side on the single display screen, but it is not limited to this. For example, the present invention may also be applied to a radar apparatus including a plurality of display units (so called multi-display radar apparatus), for example. In this case, the PPI-scope display section 20 may be displayed on a different display unit (different display screen) from the A-scope display section 21. Also in this case, the effects of the present invention can be obtained as long as both the PPI-scope display section 20 and the A-scope display section 21 are displayed such that they can be compared by viewing.

The drawings used in the description (FIGS. 3 to 7) show the example where the PPI-scope display section 20 and the A-scope display section 21 are displayed horizontally side by side, but it is not limited to this, and they may be displayed vertically side by side or diagonally side by side. Alternatively, for example, the PPI-scope display section 20 may even be spaced from the A-scope display section 21, as long as it does not prevent the comparison of the PPI-scope display section 20 and the A-scope display section 21 by viewing.

Figure 8:
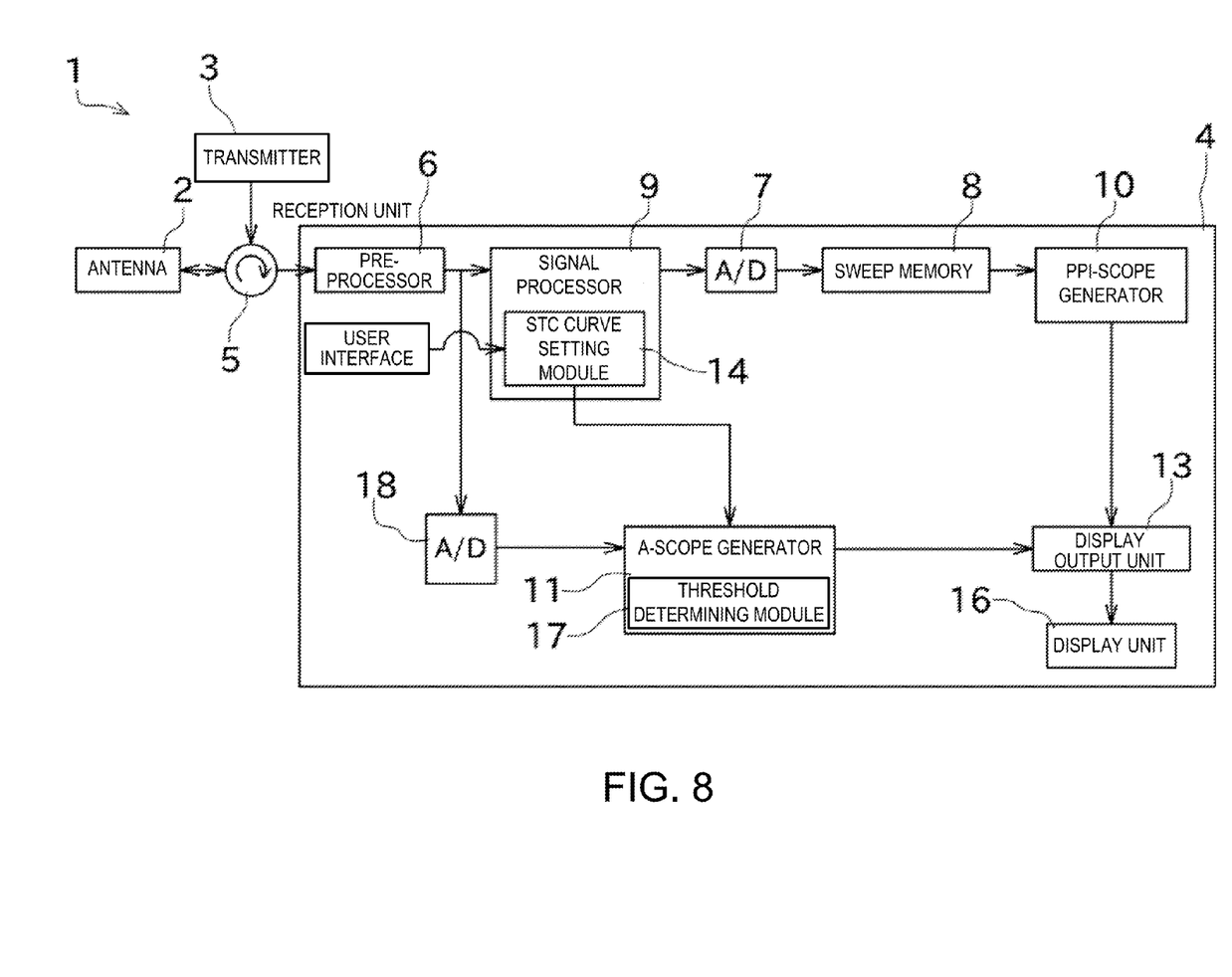
FIG. 8 is a block diagram showing a configuration of a radar apparatus according to another modification.

The signal processor 9 of the above embodiments performs the signal processing (STC processing) on the data obtained by A/D-converting the reception signal, but it is not limited to this, and the present invention can be applied even with the configuration of performing the signal processing on the analog reception signal which is the signal before A/D-converted. Such a modification is shown in FIG. 8. In this case, the A/D converter 7 is provided after the signal processor 9, converts the analog processed signal outputted from the signal processor 9, and outputs it to the sweep memory 8. The PPI-scope generator reads the signal-processed data which is stored in the sweep memory 8, and generates the PPI-scope radar image. Additionally, in this modification, in order to A/D-convert the analog reception signal before signal-processed by the signal processor 9, a second A/D converter 18 is provided separately. The A-scope generator 11 generates the A-scope radar image based on the data outputted from the second A/D converter 18 (reception data before signal-processed by the signal processor 9). Note that, alternative to separately providing the A/D converter 7 and the second A/D converter 18, the functions thereof may be achieved by time-sharing a single A/D converter.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar reception device, comprising:
a reception signal acquirer configured to acquire, in an Rθ-coordinate system, a reception signal received by an antenna that rotates at a predetermined cycle;
a signal processor configured to perform signal processing on the reception signal in the Rθ-coordinate system by applying a threshold on a signal level of the reception signal, and output the processed signal in the Rθ-coordinate system;
a PPI-scope generator configured to convert the processed signal from the Rθ-coordinate system into an XY-orthogonal coordinate system and generate a PPI-scope radar image in a PPI-scope;
an A-scope generator configured to generate an A-scope radar image where both the reception signal before being signal-processed by the signal processor and a plurality of threshold curves superimposed on the reception signal are illustrated in an A-scope, the plurality of threshold curves showing a relation between the threshold and the reception signal according to a distance from the antenna;
a display output unit configured to display the PPI-scope radar image and the A-scope radar image on a display unit simultaneously; and
a user interface configured to accept a user input including a user selection of one of the plurality of threshold curves illustrated in the A-scope,
wherein the signal processor performs the signal processing by using the threshold curve selected via the user interface.

2. The radar reception device of claim 1, wherein the user interface accepts the user input that further includes input to adjust or change the threshold curve selected via the user interface in a state where the threshold curve is displayed on the display unit, and
wherein the A-scope generator generates the A-scope radar image where the adjustment or the changing is reflected thereon.

3. The radar reception device of claim 1, wherein the A-scope generator varies a display mode between a currently selected threshold curve and a non-selected threshold curve.

4. The radar reception device of claim 1, further comprising a threshold determiner configured to determine whether the signal level of the reception signal, before being signal-processed by the signal processor, exceeds the threshold,
wherein based on a determination result of the threshold determiner, the A-scope generator generates the A-scope radar image by varying a display mode between a reception signal element of the reception signal having a signal level above the threshold and a reception signal element of the reception signal having a signal level below the threshold.

5. The radar reception device of claim 4, wherein the display mode of a reception signal element of the reception signal illustrated in the A-scope, for which the signal level exceeds, is correlated with the display mode of an echo image contained in the PPI-scope radar image that corresponds to the reception signal element.

6. The radar reception device of claim 1, wherein the A-scope generator generates the A-scope radar image where the reception signal in a predetermined A-scope display direction is illustrated in the A-scope.

7. The radar reception device of claim 6, wherein the user interface specifies the A-scope display direction on the PPI-scope radar image displayed on the di splay unit.

8. A radar apparatus, comprising:
the radar reception device of claim 1;
the antenna;
and a transmitter for applying a transmission signal to the antenna.

9. A method of displaying a radar reception signal, comprising:
acquiring, in an Rθ-coordinate system, a reception signal received by an antenna that rotates at a predetermined cycle;
performing signal processing on the reception signal in the Rθ-coordinate system by applying a threshold on a signal level of the reception signal, and outputting the processed signal in the Rθ-coordinate system;
converting the processed signal from the Rθ-coordinate system into an XY-orthogonal coordinate system and generating a PPI-scope radar image in a PPI-scope;
generating an A-scope radar image where both the reception signal before being signal-processed by the performing the signal processing and a plurality of threshold curves superimposed on the reception signal are illustrated in an A-scope, the plurality of threshold curves showing a relation between the threshold and the reception signal according to a distance from the antenna;
displaying the PPI-scope radar image and the A-scope radar image on a display unit simultaneously; and
accepting a user input including a user selection of one of the plurality of threshold curves illustrated in the A-scope,
wherein the signal processing is performed by using the threshold curve selected via the user selection.

10. The radar reception signal displaying method of claim 9, wherein the accepting the user input further includes accepting the user input to adjust or change the threshold in a state where the threshold curve selected via the user selection is displayed on the display unit, and
wherein the generating the A-scope radar image in the A-scope includes generating the A-scope radar image where the adjustment or the changing is reflected thereon.

11. The radar reception signal displaying method of claim 9, wherein the generating the radar image in the A-scope includes varying a display mode between a currently selected threshold curve and a non-selected threshold curve.

12. The radar reception signal displaying method of claim 9, further comprising determining whether the signal level of the reception signal, before being signal-processed by the performing the signal processing, exceeds the threshold,
wherein the generating the A-scope radar image in the A-scope includes generating, based on the determination result, the A-scope radar image by varying a display mode between a reception signal element of the reception signal having a signal level above the threshold and a reception signal element of the reception signal having a signal level below the threshold.

13. The radar reception signal displaying method of claim 12, wherein the display mode of a reception signal element of the reception signal illustrated in the A-scope, for which the signal level exceeds the threshold, is correlated with the display mode of an echo image contained in the PPI-scope radar image.

14. The radar reception signal displaying method of claim 9, wherein the generating the A-scope radar image in the A-scope includes generating the A-scope radar image where the reception signal in a predetermined A-scope display direction is illustrated in the A-scope.

15. The radar reception signal displaying method of claim 14, wherein the accepting the user input includes specifying the A-scope display direction on the PPI-scope radar image displayed on the display unit.

* * * * *

UNITED STATES PATENT AND TRADEMARK OFFICE
CERTIFICATE OF CORRECTION

PATENT NO. : 9,557,410 B2  
APPLICATION NO. : 14/037266  
DATED : January 31, 2017  
INVENTOR(S) : Toshiaki Takaki et al.

Page 1 of 1

It is certified that error appears in the above-identified patent and that said Letters Patent is hereby corrected as shown below:

In the Claims

Column 17, Line 3, delete "di splay" and insert --display--.

Signed and Sealed this
Twenty-fourth Day of April, 2018

Andrei Iancu
*Director of the United States Patent and Trademark Office*